Patented Sept. 27, 1932

1,880,038

UNITED STATES PATENT OFFICE

HUGH KELSEA MOORE, OF BERLIN, NEW HAMPSHIRE, ASSIGNOR TO BROWN COMPANY, OF BERLIN, NEW HAMPSHIRE, A CORPORATION OF MAINE

CEMENT COMPOSITION AND PROCESS OF PRODUCING SAME

No Drawing. Application filed January 12, 1928. Serial No. 246,385.

This invention relates to a cement composition, and more particularly one which is acid-resistant and is effective in bonding together acid-resistant bricks such as used for lining the digesters employed in carrying out the acid sulphite process of digesting chipped wood or other raw cellulosic material in the production of cellulose pulp.

In the usual acid sulphite process of digestion, a sulphurous acid solution of calcium sulphite is used to effect the liberation of fiber from the raw cellulosic material. Such a liquor, particularly during the later stages of digestion—that is, when free $SO_2$ is relieved therefrom—precipitates insoluble calcium salts on the lining, e. g., calcium sulphite, which tends to oxidize to calcium sulphate. This precipitate or scale preserves the lining and cement joints from the deteriorating action of the acid liquor, so that such joints as consist of ordinary Portland cement, litharge glycerine cement, or the like, will in practice furnish sufficient resistance to such liquor as above described.

It has been found that a high grade pulp having characteristics particularly suiting it, for example, as a raw material for the production of a finished pulp high in alpha or resistant cellulose, is produced by the digestion of raw cellulosic material in sulphurous acid solutions of alkali metal sulphites, e. g., in a sulphurous acid solution of sodium sulphite, rather than by digestion in a sulphurous acid solution of calcium sulphite, for not only does a sulphurous acid solution of sodium sulphite favorably modify the characteristics of the pulp for manufacture into rayon or other cellulose derivatives, but yields a pulp which is low in insoluble ash content,—this characteristic being particularly specified by some derivative manufacturers.

The use of an acid solution of sodium bisulphite, however, entails certain ineluctable disadvantages, for when the usual cements hereinbefore mentioned are used for bonding together the acid-resistant bricks of a sulphite digester lining, it is found that the action of such a solution dissolves or disintegrates such cements and rapidly impairs the lining. This disadvantage is doubtless due to the fact that an acid solution of sodium bisulphite does not precipitate insoluble salts such as are precipitated by sulphurous acid solutions of calcium sulphite, but tends rather to react with the cements and form soluble salts therewith.

I have discovered that it is possible to produce hydraulic barium base or mixed barium and calcium base cements, and that when such cements are mixed with the proper amount of water and allowed to set, they are remarkably effective in resisting dissolution or disintegration by acid digesting liquors. In fact, when a cement of this character is subjected to the action of acid digesting liquors under fiber-liberating conditions, it increases in acid resistivity, for its physical characteristics are favorably modified under the conditions prevailing during fiber liberation. For instance, when such cement initially sets, it may be more or less porous and chalk-like, and may be abradable by scratching with the finger nails, but after subjection to the action of the acid liquor, it acquires a hard, impermeable crust having a glazed surface.

It has heretofore been attempted to make hydraulic barium base cements, but such attempts ended in failure, for satisfactory cements of this character cannot be made by following the typical Portland cement formulas or by employing the usual cement-forming conditions. For instance, the Standard Yearbook of 1927, of the National Bureau of Standards (Bureau of Standards Miscellaneous Publication No. 77) contains the following statement, on pages 268 and 269, under the caption "Constitution and Hardening of Cement"

"In addition to the studies of cement carried on in cooperation with the Portland Cement Association, work has been done in the study of cements composed largely of oxides of titanium or barium. It was found that the former developed no particular hardening properties unless considerable amounts of alumina were present. The study of barium silicates and aluminates showed that both, and especially the latter, develop excellent hardening properties. However, neither was hydraulic since the large amount of barium hydroxide which crystallized from the silicate ultimately resulted in disintegration and the large amount of a reversible very sticky colloid formed from the aluminate in the presence of water resulted in expansion to such a degree that failure resulted when the hardened aluminate was placed in water. Some cements approaching the composition of Portland cement, but containing varying amounts of iron, were also made, but the data obtained did not permit of making any positive conclusions."

Before the cement of the present invention was discovered, much research work was carried on and many failures were encountered. During such research work, many cement formulas were tried and the cements prepared under various temperature conditions. Some cements would not set, and others would develop so much heat that when water was added, the composition would harden in a few seconds, so that testing briquettes could not be made. Such cements are not what are properly termed "hydraulic cements." Even after a formula which would yield a satisfactory cement was established, it was discovered that the preparation of such cement must be effected within a certain temperature range. If, for instance, the cement were prepared below this range, it would set too rapidly, would usually be incapable of withstanding the action of an acid cooking liquor, and would likely develop contraction cracks. If, on the other hand, the cement were prepared above this range, it would set too slowly, if at all, and have but little strength after setting, would usually be reacted upon by acid cooking liquors, and would likely develop both expansion and contraction cracks.

In producing the cement of the present invention, a suitable barium-bearing material such as barium oxide or barium carbonate, or a suitable mixture of barium-bearing material and calcium-bearing material such as calcium oxide or calcium carbonate is heated and chemically combined with a suitable proportion of alumina and silica. The alumina and silica may be used in the form of any suitable raw materials. For instance, both these constituents may be used in the form of clay or its equivalent, but if such material does not contain the required amount of silica to produce a cement of the formula desired, additional silica in required amount may be used, so that upon heating the mixture a cement of desired composition or formula will result. The raw materials, after being mixed, are preferably pulverized to a very fine degree, for instance until they pass through a 200-mesh sieve. Or the materials may be pulverized separately and then mixed, a physical homogeneous mixture being produced in either case. This mixture is then heated and clinkered at the desired temperature conditions. I have found that the presence of a small proportion of iron oxide as such, or iron in a form convertible to oxide, e. g., free iron or ferric carbonates or basic carbonates, and either added or present as an impurity in the cement-forming ingredients, is advantageous, as it apparently reduces the clinkering temperature of the mixture. After the desired heating and clinkering of the mixture has been effected, the resulting clinkered mixture is pulverized while in a dry condition until, say, approximately all passes through a 200-mesh sieve, and is preferably kept from contact with air or moisture until necessary for use.

In preparing a cement according to the present invention on a small scale, using barium oxide as the barium-bearing material, the method of procedure was substantially as follows. The pulverized mixture of cement-forming ingredients was put into clay crucibles and then indirectly heated to the desired temperature, as in an electric furnace. The furnace which I employed was one comprising two spaced graphite blocks serving as electrodes, a mass of broken carbon pencils between the electrodes serving as the electro-conductive heating mediums. The charged crucibles were placed on the electro-conductive mass, and electric current supplied to heat the crucibles to the desired temperature. By employing barium oxide as a raw material, the presence of $CO_2$ in the furnace atmosphere or in the charge is avoided, and under these conditions a cement having the desired characteristics may be prepared at a lower temperature than when barium carbonate is used or $CO_2$ is present in the furnace atmosphere. In order to ascertain the temperature at which the cement is being prepared, a pyrometer tube was inserted into a charge in one of the crucibles. The temperature reading thus obtained will be an arbitrary one and will depend upon the position of the end of the tube in the charge, so that in giving temperatures when cement is thus being prepared, it is necessary to take into account the size of the crucible and the position of the end of the pyrometer tube in the charge. In the present procedure, the crucibles employed were shaped like flower pots, being 4½ inches in diameter at the top, 2½ inches at the bottom, about 9 inches high, and having walls about ¼ inch thick, and the end of the pyrometer tube was positioned in the charge approximately midway of the axis of the crucible. It is evident that by heating as described there will be a temperature gradient throughout the charge in each crucible, owing to the lag in heat conductivity from the outside of the charge near the wall of the crucible to the center of the charge where the pyrometer tube is located. Using barium oxide as the barium-bearing material, heating curves show a sharp temperature rise, beginning at about 100° F., and in various cement-forming mixtures ending at from 700° to 1000° F., this range being the apparent incipient fusing temperature of the mixture. After this apparent incipient fusion, the heating curves show a more gradual temperature rise in the mixture. Heating is continued to, say, about 2200° F., for if the mixture is not heated above about 1600° F., or is heated above about 2300° F., it is found that the resulting product, if this procedure be followed, will not have the desired characteristics.

It is thus seen that in producing cement in crucibles as hereinbefore described, the cement-forming reaction will start near the wall of the crucible and continue to the center of the charge. The pyrometer indicates only the temperature at the center of the mass, this temperature lagging behind the temperature prevailing near the wall of the crucible, as previously stated. It is imposible to tell by sight when reaction actually starts, but the sharp initial rise in temperature indicates that this is due not only to the heat being conducted through the mass, but also to heat being evolved by the cement-forming reaction.

It is quite likely that when a cement which proves to be satisfactory is prepared at a temperature of, say 1800° F., the outside of the charge may have been heated to a much higher temperature, and that the reaction there may have been completed considerably before the same temperature has been reached where the pyrometer is located. The resulting cement clinker, therefore, quite likely consists of a mixture of particles some of which have been heated to a temperature much higher than other particles, so that when a cement fails to prove satisfactory owing to too high a temperature of preparation, it is quite likely that the failure occurs not because of too high a temperature at the center of the charge, but because the charge has been overheated on the outside. On the other hand, when a cement fails because of too low a temperature of preparation, it is quite likely that this failure occurs not because the outside of the charge was overheated, but because the inside of the charge was insufficiently heated.

When barium carbonate is employed as the barium-bearing raw material in the preparation of the cement, higher temperature is necessary than in the case of barium oxide. The heating curves in such case rise gradually and represent more nearly true heat conductivity curves. It is therefore impossible to assume at what temperature incipient fusion of the charge takes place. The gradual rise in temperature is quite likely due to the fact that heat is conducted through the cement mixture without quick reaction, as in the case of barium oxide, owing to the necessity of decomposing the barium carbonate before the cement-forming reaction takes place. It is furthermore quite likely that the reaction in the case of barium oxide is exothermic, while in the case of barium carbonate it is endothermic. The range of temperature within which a good cement results, in the case of barium carbonate, is approximately between 1800° to 2400° F.

In preparing cements by indirectly heating a mass of the cement-forming ingredients, as hereinbefore described, the satisfactory temperature range of cement formation is probably that in which the cement particles heated to maximum temperature are not overheated, while particles heated to a minimum temperature are not underheated. In commercial cement-making, on the other hand, where all the particles are directly and substantially uniformly heated, a definite optimum cement-forming temperature lying somewhere in this range can be established.

Certain specific examples of procedure which may be followed in producing cement compositions such as herein described will now be given. The mol-formula of a cement composition established as being satisfactory in the following example was approximately $9BaO.Al_2O_3.5SiO_2.O.17Fe_2O_3$. I employed as raw materials, barium monoxide, bauxite, and sand. A certain small amount of ferric oxide ($Fe_2O_3$) was added to aid the cement-forming reaction. These raw materials had the following analyses:

|  | Barium monoxide | Bauxite | Silica |
|---|---|---|---|
| Per cent |  |  |  |
| BaO | 93.2 |  |  |
| $Al_2O_3$ | Trace | 80.00 |  |
| $SiO_2$ | Trace | 10.8 | 100.0 |
| $Fe_2O_3$ |  | Trace |  |

These raw materials were mixed and pulverized in a dry condition in the following proportions by weight:

| | Parts |
|---|---|
| BaO | 1395 |
| Bauxite | 128 |
| Silica | 290 |
| $Fe_2O_3$ | 27 |

The resulting homogeneous mixture was clinkered in clay crucibles in an electric resistance furnace, as hereinbefore described, the maximum heating temperature being in the range of 1900 to 2200° F. The clinker produced in the crucible when pulverized and tested proved to be satisfactory for use as an acid-resisting cement.

Another example of procedure in which a chemically combined barium and calcium base cement composition having the mol-formula $6BaO.3CaO.2Al_2O_3.5SiO_2.O.17Fe_2O_3$, established as being satisfactory, was substantially as follows. I employed as raw materials barium monoxide, lime, bauxite, silica, and ferric oxide. These raw materials had the following analysis:

| | Barium monoxide | Lime | Bauxite | Silica | $Fe_2O_3$ |
|---|---|---|---|---|---|
| Per cent | | | | | |
| BaO | 94.1 | | | | |
| CaO | | 95.0 | | | |
| $Al_2O_3$ | | 1.2 | 66.22 | | |
| $Fe_2O_3$ | | .1 | 1.28 | | 100.0 |
| $SiO_2$ | Trace. | 1.2 | 6.34 | 100.0 | |

These materials were mixed and pulverized in a dry condition in the following proportions by weight:

| | Parts |
|---|---|
| BaO | 978 |
| CaO | 177 |
| Bauxite | 306 |
| Silica | 278.6 |
| $Fe_2O_3$ | 23.1 |

The resulting mixture was put in clay curcibles and heated, the maximum temperature being 2080° F. The resulting clinker, when pulverized and tested, proved to be eminently satsifactory for use as an acid-resisting cement.

By varying the proportions of the raw material, there is produced a cement composition having the mol-formula of $6BaO.3CaO.2Al_2O_3.5SiO_2.O.17Fe_2O_3$, and this has the advantage of relative cheapness.

Another example of procedure in producing a cement composition similar to that just described, but employing different raw materials and heating the mixture of cement-forming ingredients directly, was substantially as follows. In this example, I used barium carbonate as the barium-bearing material, and colloidal clay and bauxite as the alumina- and silica-bearing materials.

| | Barium carbonate | Lime | Clay | Bauxite | $Fe_2O_3$ |
|---|---|---|---|---|---|
| Per cent | | | | | |
| $BaCO_3$ | 99.6 | | | | |
| CaO | | 95.0 | | | |
| $Al_2O_3$ | | 1.2 | 22.1 | 66.12 | |
| $SiO_2$ | | 1.2 | 64.3 | 6.34 | |
| $Fe_2O_3$ | | .1 | 3.5 | 1.28 | 100.0 |

These materials were mixed and pulverized in the following proportions by weight:

| | Parts |
|---|---|
| Barium carbonate | 1290 |
| Lime | 177 |
| Colloidal clay | 455 |
| Beauxite | 153 |
| $Fe_2O_3$ | 9 |

The mixture was wetted with sufficient water to give a plastic mass, the colloidal clay serving to bind the ingredients together so that upon drying they cohere sufficiently to be handled without crumbling. The mass, while still moist and plastic, was spread out on a flat surface, then smoothed down into a layer of about ¼-inch thick and cut with a spatula into strips of from about one to three inches in length and about ¼-inch wide, and allowed to dry. The dry strips were spread over the surface of a charge of charcoal in a small open brick furnace, the end of a pyrometer tube being inserted directly into the charge of strips on the charcoal. The charcoal was then ignited, and the strips clinkered, air being supplied for the combustion of the charcoal from the bottom of the furnace under pressure, and regulated so as not to produce a temperature beyond that yielding a good cement, the maximum temperature produced being 2170° F. The resulting cement, when tested, proved to be as satisfactory as the cement produced by the procedure in the previous example.

The conditions prevailing when cement is prepared according to this last procedure approximate more nearly those prevailing in a commercial, directly-fired rotary kiln, for the size of the strips being clinkered is much smaller than the charges clinkered in the clay crucible in the previous examples, and a much more evenly burned product, which is comparable to the uniformly burned particles of cement produced in a rotary kiln is obtained. Furthermore, in this last procedure, an atmosphere of $CO_2$ surrounds the charge, such as atmosphere also prevailing in the case of commercial rotary kilns. This atmosphere of $CO_2$ serves to aid in uniformly heating the cement-forming charge by convection, as this atmosphere which is furnished by the $CO_2$ evolved as a result of decomposition of the barium carbonate and the $CO_2$ resulting from the combustion of the charcoal, permeates the charge.

In testing cements prepared according to the foregoing examples, the resulting clinker produced in each case was pulverized in a Sturtevant sample grinder, and then passed through a 200-mesh sieve. Testing briquettes were prepared in the usual way; that is, the cement was mixed with water to a normal working consistency, formed into standard-sized briquettes, which were tested in a Riehlé tensile strength testing machine. Satisfactory cements gave tensile strengths of 470 pounds per square inch, more or less, a tensile strength of this order of magnitude being quite satisfactory for bonding together the acid-resistant bricks of a digester lining. The briquettes were tested for acid resistance in a closed digester, under conditions approximating those prevailing during actual commercial digestion in the manufacture of sulphite pulp. To this end, the briquettes were submerged in a cooking liquor consisting of a sulphurous acid solution of sodium sulphite of 1% combined and 5% free $SO_2$ content. The digester was then closed and its contents heated to from 225° to 290° F., and a pressure of about 75 pounds per square inch. The briquettes were kept under these conditions for about fifteen days, at the end of which time the digester was opened and the condition of the briquettes noted. In the case of poor cements, a total disintegration of the briquettes sometimes took place; at other times, only a gradual wearing away appeared to have taken place. In the case of satisfactory cements, such as herein described, the briquettes were favorably modified, the acid liquor having produced a hard, impermeable crust thereon, this modification varying in degree with various satisfactory cements, as some may initially be of a chalk-like consistency or even crumbly, while others may initially be much harder. The degree of hardness and strength of the original set cement appears to depend to a considerable extent upon the amount of water used in its preparation. Thus, if an amount of water in excess of that necessary to produce a workable mixture is employed, the set cement will generally be more or less crumbly and have little tensile strength, while if a small amount of water is used, the set cement will generally be much harder and stronger.

Generally speaking, straight barium base cements have the disadvantageous property of quick setting. This disadvantage may be partly alleviated by mixing the cement with ice water, instead of with water at ordinary temperatures, with the result that the setting action will be sufficienly retarded so that expert workmen can accomplish the desired masonry work in a digester in the required time, but necessarily even then the cement must be mixed frequently and in comparatively small batches. The setting times of different straight base barium cements will, however, vary, depending upon their compositions and the temperature conditions prevailing during their preparation. For example, such cements may have an initial time of set, varying from about 3 to about 55 minutes, and a final time of set varying from about 10 to 60 minutes. A rapid setting cement generally develops considerable heat while initial setting is taking place.

I have discovered that when a straight barium base cement is mixed with ordinary Portland cement, the mixture has a much slower setting time than the barium cement alone,—although faster than the Portland cement alone,—and when set has satisfactory tensile strength and will successfully withstand the action of acid cooking liquors. I have further discovered that barium base cements which cannot withstand the action of acid cooking liquors will successfully do so when mixed with Portland cement. For instance, a straight barium base cement of the mol-formula $9BaO.3Al_2O_3.5SiO_2.0.17 Fe_2O_3$, which for some reason or other (probably improper temperature of preparation) could not withstand the action of acid cooking liquors although quite satisfactory in other respects, when mixed with Portland cement was quite satisfactory in all respects. In one particular case, a mixture of 53% by weight barium base cement of the character described and 47% by weight Portland cement was used. The mixture had an initial set of 70 minutes and a final set of 90 minutes, while the barium base cement alone had an initial set of 55 minutes and a final set of 60 minutes.

Chemically combined barium and calcium base cements generally have a materially longer setting time than that of straight barium base cements, and have a tensile strength fully as satisfactory as that of the straight barium base cements. Thus, a mixed base cement, prepared as herein described, when mixed with quartz sand in the proportions of 53% cement and 47% sand, had an initial set of approximately 2½ hours, a final set of approximately 6 hours, and a tensile strength of about 750 pounds per square inch. Inasmuch as cements of this character are generally highly effective in withstanding the action of acid cooking liquors and may be produced at lower cost than straight barium base cements because of the substitution of less expensive calcium base material for part of the barium base material, I prefer such cements over straight barium base cements.

In using the cement of the present invention in practice, one precaution is preferably taken, and that is, one should prevent abrasion of the cement before the hard, impermeable crust is formed thereon, even when the set cement is initially quite hard. Thus, a digester having been lined with acid-proof brick laid in the cement of the present invention is filled with the acid cooking liquor, but is not charged with chips, and is then heated to fiber-liberating conditions of temperature and pressure. This produces a hard, impermeable crust on the surface of the cement, so that subsequently the usual procedure of first charging the digester with chips and then running in the acid liquor may be followed without injury to the cement. Although the protecting crust may be quite thin, the removal of this crust as by abrasion simply exposes new cement surface which immediately acquires a new protecting crust.

While I have described cement compositions particularly advantageous for use in lining digesters in which a sulphurous acid solution of sodium bisulphite is employed as the cooking liquor, it will of course be understood that the use of my cement is not limited thereto and that it may be applied where other acid cooking liquors are employed, or in other connections where resistance to the action of acid liquors is desired.

It will be observed by those skilled in the art that the mol-formulas of the cements produced in accordance with my invention contain a mol-proportion of barium base or chemically combined barium and calcium base much lower than that of calcium base present in Portland cement, and that, therefore, the cements of the present invention cannot be considered as an ordinary cement in which barium oxide has been substituted for or occupies the place of calcium oxide. For instance, a typical Portland cement has the following analysis:

|      | Per cent |
| --- | --- |
| CaO | 62 |
| $Al_2O_3$ | 7.5 |
| $SiO_2$ | 22 |
| MgO | 2.5 |
| $Fe_2O_3$ | 2.5 |
| $SO_3$ | 1.5 |

This analysis corresponds to the mol-formula: $15CaO.Al_2O_3.5 SiO_2.MgO.xFeO_3$, this mol-formula being quite different from the mol-formulas established by the present invention. In fact, if $15BaO$ is substituted for $15CaO$ in this mol-formula, and a cement prepared according to this mol-formula, the cement thus prepared will not be satisfactory for the purposes hereinbefore set forth.

While as in the case of Portland cement it is impossible to ascertain precisely the chemical structure or structural formula of cements produced according to the present invention, it is quite possible that a barium ferroalumino silicate results. Portland cement is considered by many as a mixture of tricalcium silicate with some dicalcium silicate and calcium aluminates. As hereinbefore stated, the mol-formula of a barium cement produced as herein described does not have the mol-formula of a Portland cement, and it is impossible to ascertain whether or not such barium cement is a mixture of tribarium silicate, dibarium silicate and alumino silicate. I suggest that the following structural formula might explain at least hypothetically the construction of a cement having, say the mol-formula $10BaO.Al_2O_3.5 SiO_2.xFe_2O_3$ established by me as satisfactory:

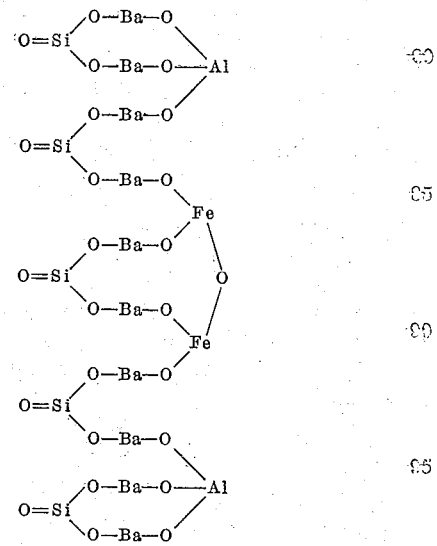

The structure perhaps remains the same in a chemically combined barium and calcium base cement, except that calcium occupies certain of the places occupied by the barium in the straight barium base cement. I do not say however, that this is the true structure of this cement, for, as previously stated, I have no means of checking it.

Having thus described certain embodiments of this invention, it is evident that change and modification might be made therein without departing from the spirit or scope of invention as defined in the appended claims.

So far as generic subject matter is concerned, this is a continuation, of my application Serial No. 161,248, filed January 14, 1927.

What I claim is:

1. A hydraulic cement composition resistant after setting to attack by water and whose analysis indicates a dominant mol-proportion of barium oxide base, a smaller mol-proportion of silica, and a still smaller mol-proportion of alumina, the mol-proportion of base in said composition being much lower than that of Portland cement.

2. A hydraulic chemically combined barium and calcium base cement composition resistant after setting to attack by water and whose analysis indicates a dominant mol-proportion of base in the form of barium and calcium oxides, a small mol-proportion of silica, and a still smaller mol-proportion of alumina, the mol-proportion of both barium and calcium base in said composition being much lower than that of Portland cement.

3. A hydraulic cement composition resistant after setting to attack by water and whose analysis indicates a dominant mol-proporton of barium oxide base, a smaller mol-proportion of silica, a still smaller mol-proportion of alumina, and a still smaller mol-proportion of ferric oxide, the mol-proportion of base in said composition being much lower than that of Portland cement.

4. A hydraulic chemically combined barium and calcium base cement composition resistant after setting to attack by water and whose analysis indicates a dominant mol-proportion of base in the form of barium and calcium oxides, a smaller mol-proportion of silica, a still smaller mol-proportion of alumina, and a still smaller mol-proportion of ferric oxide, the mol-proportion of both barium and calcium base in said composition being much lower than that of Portland cement.

5. A process of producing a hydraulic cement composition which comprises clinkering such proportions of barium-bearing, alumina-bearing, and silica-bearing materials, that the mol-proportion of base in the resulting composition is much lower than that of Portland cement.

6. A process of producing a hydraulic cement composition, which comprises clinkering at about 1600° F. to 2500° F. such proportions of barium-bearing, alumina-bearing, and silica-bearing materials that the mol-proportion of base in the clinkered product is much lower than that of Portland cement and pulverizing the clinkered product.

7. A process of producing a hydraulic cement composition which comprises clinkering such proportions of barium-bearing, alumina-bearing, and silica-bearing materials in the presence of a relatively small amount of ferric oxide, that the mol-proportion of base in the resulting composition is much lower than that of Portland cement.

8. A process of producing a hydraulic cement composition which comprises clinkering such proportions of barium-bearing, calcium-bearing, alumina-bearing, and silica-bearing materials that the mol-proportion of base in the clinkered products is much lower than that of Portland cement, and pulverizing the clinkered product.

9. A hydraulic cement composition having approximately the mol-formula:

$$9AeO.Al_2O_3.5SiO_2.xFe_2O_3$$

where Ae represents both barium and calcium and where the barium predominates in proportion over the calcium.

10. A hydraulic cement composition having approximately the mol-formula:

$$9AeO.Al_2O_3.5SiO_2.xFe_2O_3$$

where Ae represents barium.

11. A hydraulic cement composition having approximately the mol-formula:

$$9AeO.XAl_2O_3.5SiO_2,$$

where Ae represents either barium or both barium and calcium, where X may be from about 1 to 3 mols of $Al_2O_3$, and where the barium predominates in proportion over the calcium.

In testimony whereof I have affixed my signature.

HUGH KELSEA MOORE.